United States Patent
Shahosseini et al.

(10) Patent No.: US 10,875,655 B2
(45) Date of Patent: Dec. 29, 2020

(54) VIBRATION ISOLATION DEVICE, ESPECIALLY FOR AIRCRAFT APPLICATIONS

(71) Applicant: HUTCHINSON AEROSPACE & INDUSTRY Inc., Burbank, CA (US)

(72) Inventors: Iman Shahosseini, Woodland Hills, CA (US); John Nall, Granada Hills, CA (US); Ivan Roson, Long Beach, CA (US)

(73) Assignee: HUTCHINSON AEROSPACE & INDUSTRY Inc., Burbank, CA (US)

( * ) Notice: Subject to any disclaimer, the term of this patent is extended or adjusted under 35 U.S.C. 154(b) by 759 days.

(21) Appl. No.: 15/630,992

(22) Filed: Jun. 23, 2017

(65) Prior Publication Data

US 2018/0370643 A1  Dec. 27, 2018

(51) Int. Cl.
*B64D 27/26* (2006.01)
*F16F 1/371* (2006.01)
*B64D 41/00* (2006.01)

(52) U.S. Cl.
CPC ........... *B64D 27/26* (2013.01); *F16F 1/3713* (2013.01); *B64D 41/00* (2013.01); *B64D 2041/002* (2013.01); *F16F 2230/24* (2013.01)

(58) Field of Classification Search
CPC ........ B64D 27/26; B64D 41/00; F16F 1/3713
See application file for complete search history.

(56) References Cited

U.S. PATENT DOCUMENTS

| | | | | |
|---|---|---|---|---|
| 2,510,963 A | * | 6/1950 | Dibblee | F16F 15/073 267/140.4 |
| 3,081,993 A | | 3/1963 | Wallerstein | |
| 5,197,692 A | * | 3/1993 | Jones | B64D 27/18 188/320 |
| 5,762,295 A | * | 6/1998 | McGuire | B64D 27/26 244/54 |
| 5,788,372 A | * | 8/1998 | Jones | B64D 27/26 137/513.3 |
| 6,715,746 B2 | * | 4/2004 | Bachmeyer | F16F 3/087 188/371 |
| 2016/0009403 A1 | | 1/2016 | Kumar et al. | |

FOREIGN PATENT DOCUMENTS

SU   896 274   1/1982
SU   932 000   5/1982

* cited by examiner

*Primary Examiner* — Justin M Benedik
(74) *Attorney, Agent, or Firm* — Clark & Brody LP

(57) ABSTRACT

A vibration isolation device comprises a frame for mounting on an engine casing, an axis to be mounted to an external component to isolate, a resilient member located between the frame and the axis, and a fuse mechanism ensuring that the vibration isolation device presents a first stiffness when loads applied to said vibration isolation device are below a predetermined threshold load, and a second stiffness, lower than the first stiffness, when loads applied to the vibration isolation device are at least equal to the predetermined threshold load. The fuse mechanism constrains the resilient member within a predetermined space when loads applied to the vibration isolation device are below the predetermined threshold load and to release the resilient member so that this latter is capable of deforming beyond said predetermined space when loads applied to the vibration isolation device are at least equal to the predetermined threshold load.

12 Claims, 16 Drawing Sheets

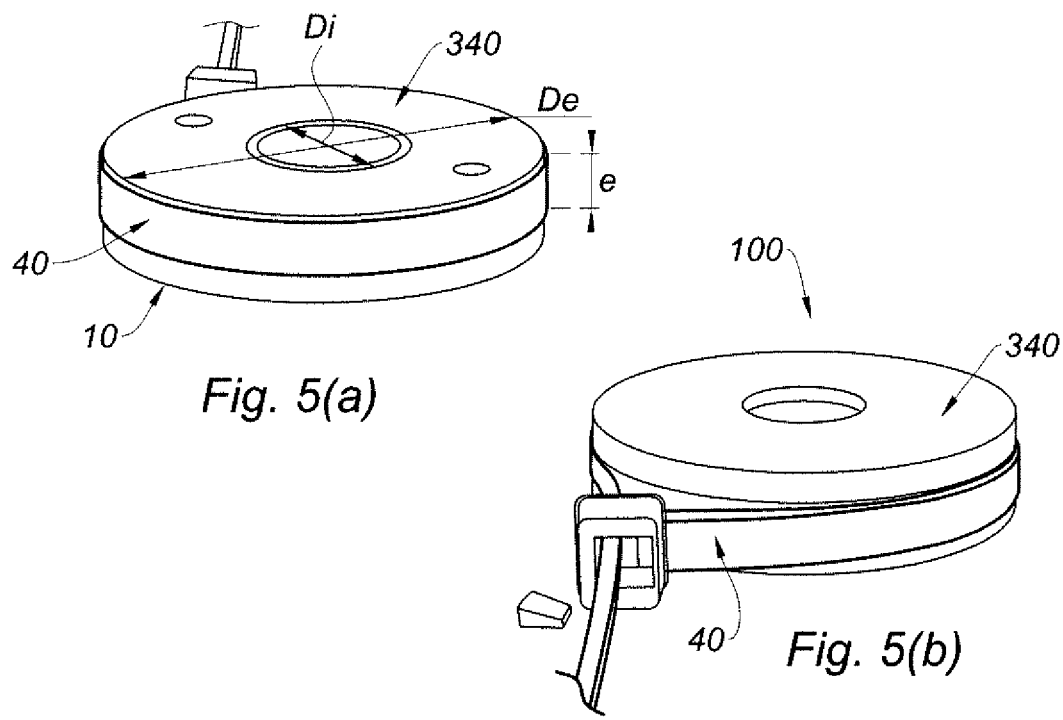
Fig. 5(a)
Fig. 5(b)
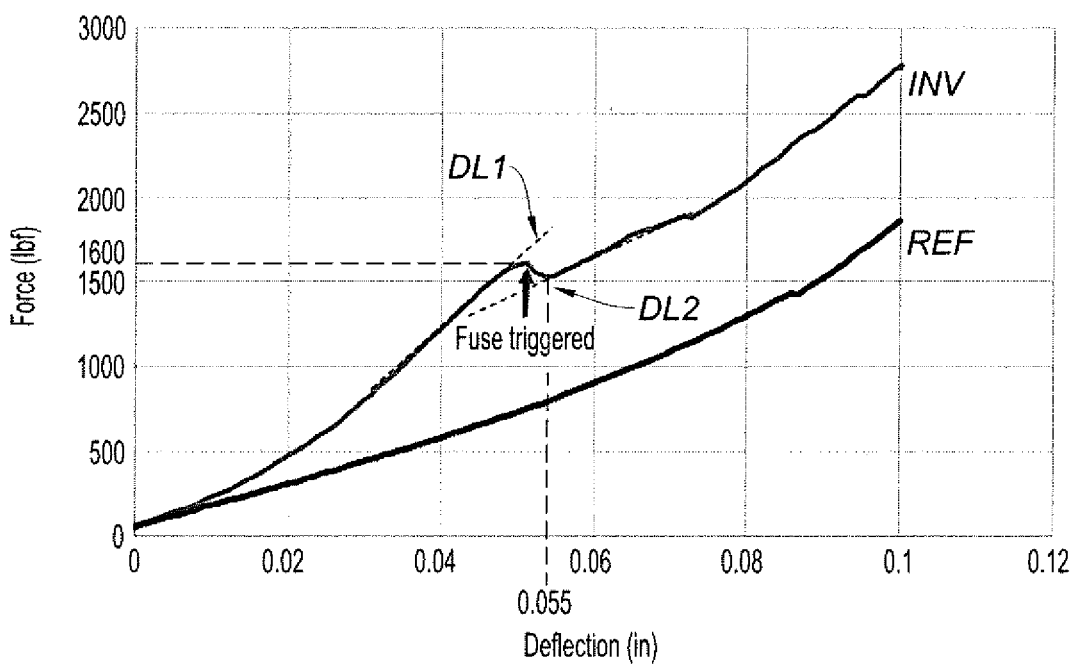
Fig. 6

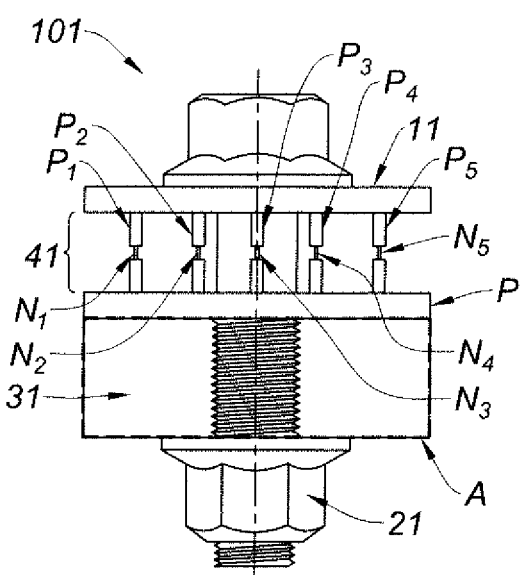
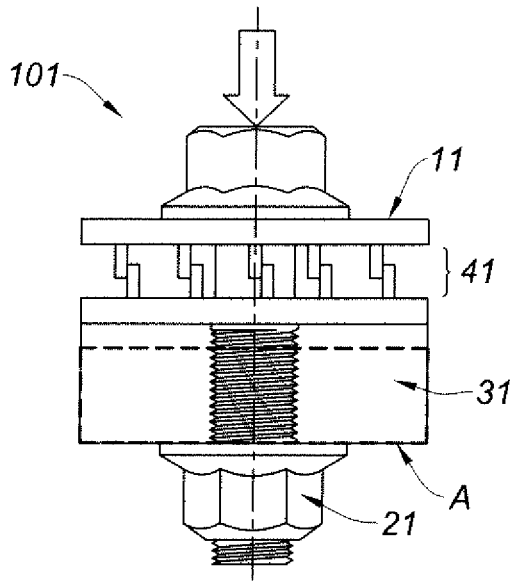
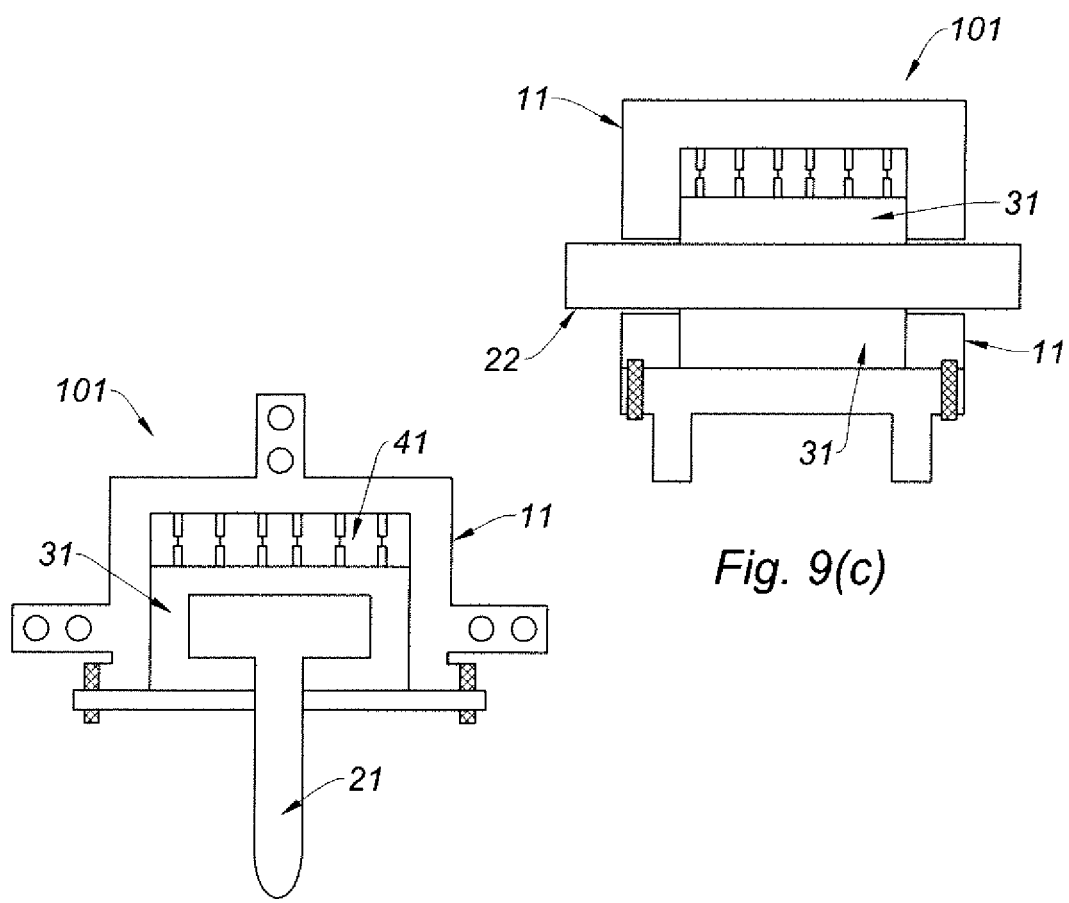
Fig. 9(a)
Fig. 9(b)
Fig. 9(c)
Fig. 9(d)

VIBRATION ISOLATION DEVICE, ESPECIALLY FOR AIRCRAFT APPLICATIONS

FIELD OF THE INVENTION

The invention deals with a vibration isolation device, especially for aircraft applications.

BACKGROUND ART

In an aircraft application, such a device may be used to isolate the aircraft frame from an engine, such as a turbo-propeller or a turbo-fan.

We can refer to FIG. 1, comprising FIGS. 1(a) and 1(b), where we can see an aircraft engine 1, a yoke 2 mounted on the engine 1 through vibration isolation devices 3a, 3b (engine mounts). In the middle of the yoke 2, there is provided a plate 4, which is mounted on the yoke 2 and on the aircraft structure (a wing for example, not shown).

Typically, each vibration isolation device comprises a housing (frame) attached to the engine, an axis crossing the housing through openings made in the housing which is attached to the yoke and, therebetween, a resilient member such as an elastomer.

In that case, the vibration isolation device is often named "engine mount".

Each engine mount is designed to provide for a high stiffness in normal operation.

However, in case of an unwanted event, such as a fan blade-out, the engine becomes unbalanced and the high loads reached are transferred to the airframe structure due to the high stiffness of the engine mounts.

As a consequence, the different mechanical structures are highly solicited.

One possibility to ascertain the mechanical integrity of the airframe structure in such a situation is to design more resistant structures and then more heavier.

It is not desirable because it increases the weight of the aircraft.

For that reason, it has already been proposed specific designs for the engine mounts.

For example, US 2016/0009403 A1 (D1) proposes an engine mount for which the openings of the housing have a specific design, namely an "ovalized" shape compared to the design of a classical engine mount wherein those openings have a circular cross-section.

In normal operation, the resilient member, such as an elastomer, provides for a high stiffness between the axis and the housing.

However, in case of an unwanted event such as a fan blade-out, the axis mounted on the yoke may displace further than with a classical engine mount to avoid any repetitive contact between the axis and the housing. As a consequence, the mechanical integrity of the axis and of the housing are preserved.

To ensure that the axis mounted on the yoke may displace further with respect to the housing in such an event, it is proposed in one embodiment (FIG. 7 of the document), a fuse mechanism based on a frangible part of the wall of the housing. In normal operation, each opening has a circular shape and above a threshold load between the axis and said frangible part, this latter breaks to provide for an "ovalized" shape of the opening, avoiding or at least limiting the contact between said axis and said housing. One drawback of this solution is that once the fuse mechanism has broken, the mount cannot be reused.

In an aircraft, a vibration isolation device may also be used to isolate an auxiliary power unit (APU) from the vibrations coming from the engine.

In this application, the vibration isolator device is often named an APU mount.

An APU mount may be found in different places in the aircraft.

For example, FIG. 2 shows different APU mounts that may be found in the aft section of the aircraft.

As another example, FIGS. 3(a) and (b) show other types of APU mounts which may be encountered within the engine casing.

For this kind of application also, it has already been proposed specific designs to avoid or at least limit, in case of an unwanted event such as a fan blade-out, the transmission of vibrations from the engine towards the APU.

We can refer to FIG. 2, comprising FIGS. 2(a) to 2(c), showing types of APU mounts 3c, 3d and where they may be found on the aircraft. In particular, FIG. 2(c) shows an external view of the APU mount 3c, where one can see a housing 30c, an axis 30'c, a resilient member 30"c being disposed within the housing 30c and around the axis 30'c.

We can also refer to FIGS. 3(a) and (b), which show several APU mounts, 3e, 3f, 3g and 3h that may be used within an aircraft engine, more precisely at the level of the tail section of the aircraft.

For example, U.S. Pat. No. 6,715,746 B2 (D2) proposes an APU mount separating an oil reservoir from the engine structure (fan casing). The APU mount comprises a housing, through which there is a central axis both connected to the housing and the reservoir. The APU mount is also mounted on the fan casing by means of a bracket rigidly mounted on said axis. The APU mount comprises a resilient member within the housing which is both mounted on the housing and the axis. A fuse mechanism is integrated within the APU to have two modes of operation of the APU. This fuse mechanism is in the present case formed thanks to mechanical weaknesses made in the axis.

In normal operation, the reservoir is rigidly connected to the fan casing through the housing, the axis and the bracket which are all rigid components. The resilient member is not solicited. However, in case of an unwanted event such as fan blade-out, the loads applied to the axis due to the imbalanced operation of the engine increase and reach a threshold value at which the axis breaks. From this time, the transmission path of loads between the fan casing and the reservoir changes by passing through the resilient member. The connection between the fan casing and the reservoir becomes softer and limits the transmission of vibrations from the engine towards the reservoir.

In that case, and contrary to the solution proposed in reference D1, the fuse mechanism may be changed without changing the whole mount.

Nevertheless, in normal operation, and contrary to the operation of the mount proposed in reference D1, the behavior is, in normal operation, highly rigid as the resilient member, not solicited, does not contribute to the vibrations damping.

An aim of the invention is to overcome the above-mentioned drawbacks.

SUMMARY OF THE INVENTION

In that aim, the invention proposes a vibration isolation device comprising:
a frame intended to be mounted on an engine casing,
a structure intended to be mounted to an external component to isolate, a resilient member located between said frame and said structure, at least one fuse mechanism ensuring that said vibration isolation device presents a first stiffness when loads applied to said vibration isolation device are below a predetermined threshold load, and a second stiffness, lower than the first stiffness, when loads applied to the vibration isolation device are at least equal to said predetermined threshold load, wherein said fuse mechanism is arranged, within said vibration isolation device, to constrain said resilient member within a predetermined space when the loads applied to the vibration isolation device are below said predetermined threshold load and to release said resilient member so that this latter is capable of deforming beyond said predetermined space when loads applied to the vibration isolation device are at least equal to said predetermined threshold load.

The vibration isolation device according to the invention may also comprise the following additional features, taken alone or in combination:

said fuse mechanism is a strap surrounding said resilient member and presenting a breaking load corresponding to said predetermined threshold load;

said fuse mechanism is a collapsible spacer mounted between said frame and said resilient member and presenting a breaking load corresponding to said predetermined threshold load;

said collapsible spacer is chosen amongst:

a plurality of parallel pillars, each pillar comprising either a necking or being twisted around its own longitudinal axis;

a plurality of X-shaped breakable structures;

a hollow structure whose main walls are deformable;

a hollowed spacer made of a continuous structure comprising voids;

a plurality of structures arranged in parallel, each structure comprising a first part having a flaw and a second part consisting of a spring mounted in series with the first part;

a honeycomb structure;

at least a first part, massy, and at least a corresponding second part, hollow, to partially receive said first part, said at least first and second parts being maintained together by a friction force;

a hollow structure, squeezable;

a plurality of parallel structures, each structure comprising a ball cooperating with a Y structure which is breakable;

said fuse mechanism comprises:

an inflatable cushion mounted between said frame and said resilient member, and a relief valve connected to said cushion, said relief valve being configured to open where the loads applied to the vibration isolation device are at least equal to said predetermined threshold load.

said resilient member is partially bonded:

to said frame, and/or where said resilient member is comprised of a stack at least containing a first layer of a resilient material, a second layer of resilient material and a plate both arranged between and more rigid than said first layer of resilient material and said second layer of resilient material:

to said plate so as to define a bonding force between said resilient member and said frame and/or said plate, said bonding force defining said fuse mechanism and corresponding to said predetermined threshold load;

said fuse mechanism comprises at least one plug cooperating with an opening made in said frame;

said fuse mechanism is comprised of at least one breakable retainer, said retainer having a first part encased within said frame and a second part projecting beyond said frame to cooperate with a plate covering the resilient member, said at least one retainer having a breakable load corresponding to said predetermined threshold load;

said at least one retainer is chosen amongst:

a retainer having a necking separating the two parts of the retainer;

a retainer having a second part thinner than its first part;

a retainer whose second part is inserted in its first part;

a retainer whose second part is bonded to its first part; or a retainer of constant section, for which said predetermined threshold value corresponds to the bending limit of the retainer.

said resilient member comprises at least one layer of an elastomer or of a thermoplastic elastomer or of a metal mesh;

said elastomer is a silicone rubber or a natural rubber;

said device comprises at least one second fuse mechanism ensuring that said vibration isolation device presents a third stiffness, lower than the second stiffness, when loads applied to the vibration isolation device are at least equal to a second predetermined threshold load, higher than said predetermined threshold load.

BRIEF DESCRIPTION OF THE DRAWINGS

The invention will be better understood and other aims, advantages thereof will appear more clearly by reading the following description, made in regard of the following annexed figures:

FIG. 4, which comprises

FIG. 5, which comprises a FIGS. 5(a) and 5(b), shows a vibration isolation device according to the first embodiment, which has been tested experimentally;

FIG. 6 is a graph showing the evolution of the force/load applied to the device as a function of the displacement for the vibration isolation device of FIG. 5 and for a reference vibration isolation device of the prior art;

FIG. 7, which comprises

FIG. 9, which comprises FIGS. 9(a) to 9(d), shows a second embodiment of a vibration isolation device according to the invention;

FIG. 10, which comprises

FIG. 11, which comprises

FIG. 12, which comprises

FIG. 13, which comprises

FIG. 15, which comprises FIG. 16, which comprises

FIG. 18, which comprises

DETAILED DESCRIPTION OF THE INVENTION

Figure 1A:
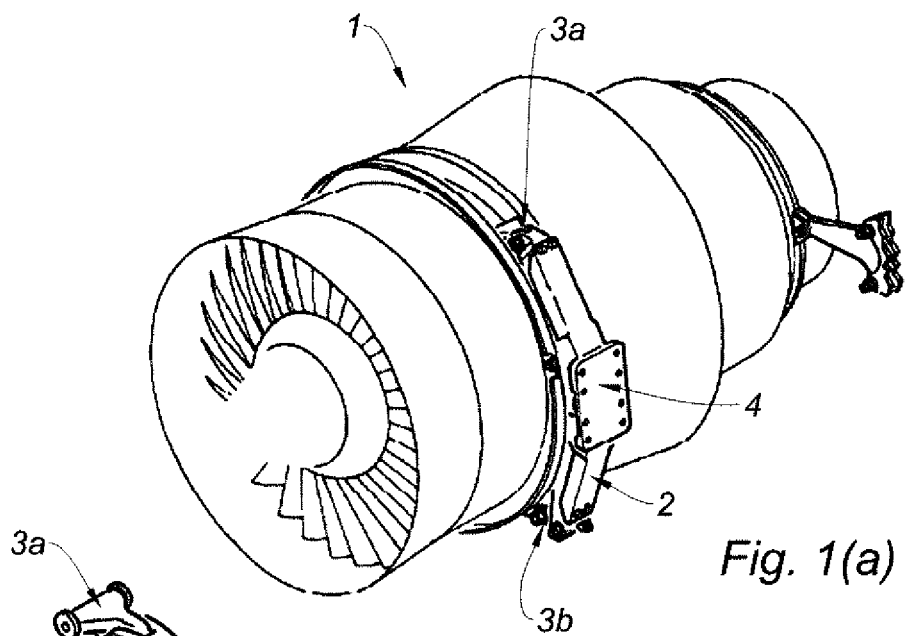
FIG. 1(a) shows an aircraft engine 1 and a yoke 2 mounted thereon.
Figure 1B:
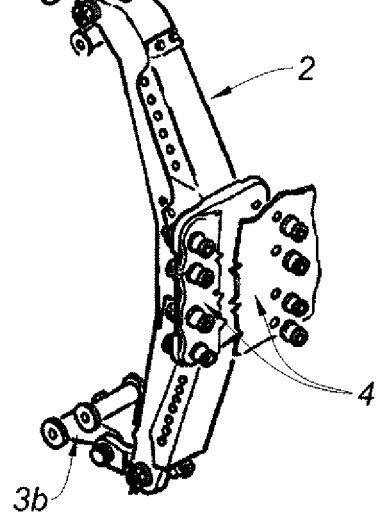
FIG. 1(b) shows the yoke of FIG. 1(a).
Figure 2A:
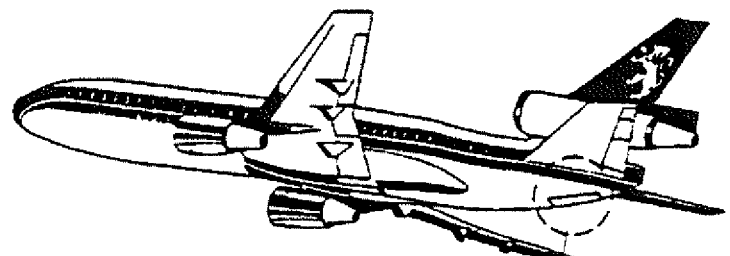
FIG. 2 shows different APU mounts that may be found in the aft section of the aircraft.
Figure 2B:
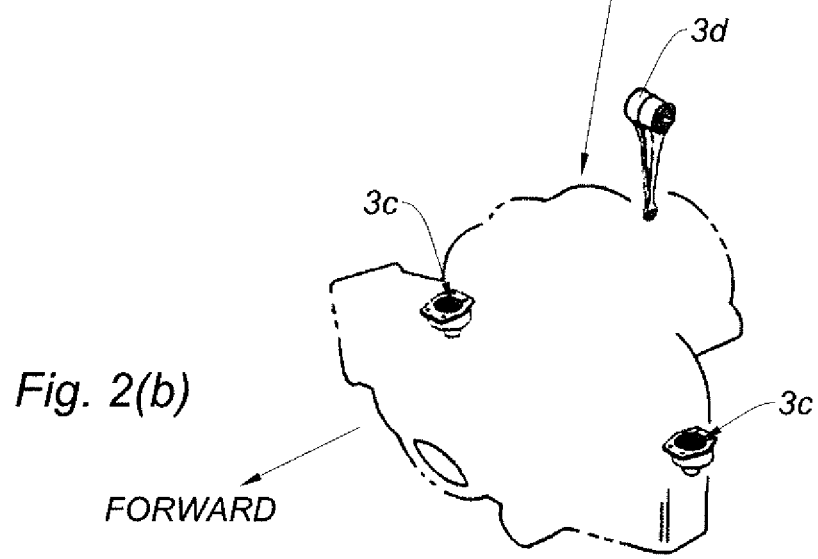
Figure 2C:
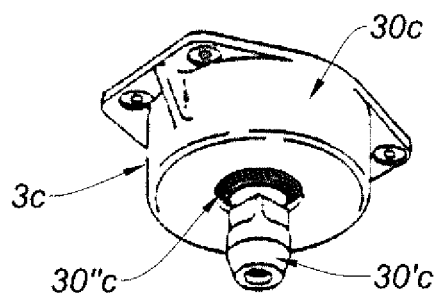
Figure 3A:
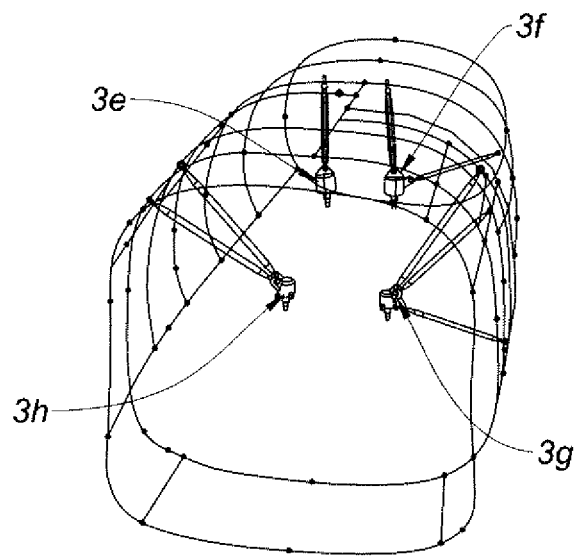
FIGS. 3(a) and 3(b) show other types of APU mounts which may be encountered within the engine casing.
Figure 3B:
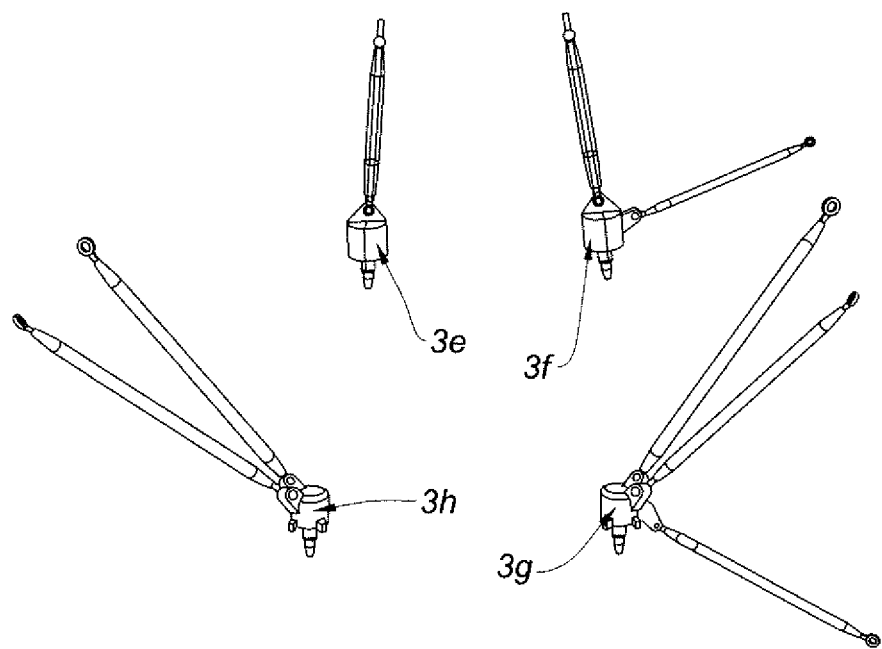

According to the invention there is provided a vibration isolation device 100 comprising
- a frame 10 intended to be mounted on an casing,
- a structure 20, for example an axis or a yoke, intended to be mounted to an external component to isolate,
- a resilient member 30 located between said frame and said structure,
- a fuse mechanism 40 ensuring that said vibration isolation device 100 presents a first stiffness when loads applied to said vibration isolation device 100 are below a predetermined threshold load, and a second stiffness, lower than the first stiffness, when loads applied to the vibration isolation device 100 are at least equal to said predetermined threshold load.

Whatever the embodiment, the fuse mechanism 40 is arranged, within said vibration isolation device 100, to constrain said resilient member 30 within a predetermined space when the loads applied to the isolation device 100 are below a predetermined threshold load and to release said resilient member 30 so that this latter is capable of deforming beyond said predetermined space when loads applied to the vibration isolation device 100 are at least equal to said predetermined threshold load.

A first embodiment of a vibration isolation device 100 according to the invention is shown in FIG. 4. More precisely, FIGS. 4(a) and 4(b) show the device 100 in a first state wherein the fuse mechanism has not been activated, respectively in a perspective view and in a vertical cut-view. FIGS. 4(c) and 4(d) show the device 100 in a second state wherein the fuse mechanism 40 has been activated.

In this embodiment, the fuse mechanism 40 is a strap surrounding the resilient member 30 and presenting a breaking load corresponding to the predetermined threshold load. In normal operation, namely below the threshold load, the vibration isolation device 100 presents a high stiffness. The resilient member 30 is constrained by the strap within the predetermined space A (represented in dashed lines in FIG. 4(b)).

When the loads applied to the vibration isolation device 100 are at least equal to the predetermined threshold value, the strap breaks so that the resilient member 30 is released. The resilient member 30 can therefore further deform beyond the predetermined space A, as can be seen in FIG. 4(d), where said space A is also represented in dashed lines). As the resilient member 30 may further deform, the vibration isolation device 100 becomes softer and then presents a lower stiffness than in normal operation.

In that way, where an unwanted event occurs, such as a fan blade-out, the vibration isolation device 100 becomes softer and avoids or at least limits the transmission of vibrations between the casing (engine casing for example) and the component to isolate (wing and consequently cockpit of the aircraft for example).

The mount may be reused by changing the strap.

It should be noted that, in the specific design shown in FIG. 4, the resilient member 30 is comprised of a stack containing a first layer 310 of elastomer, a first plate 320 more rigid than an elastomer, a second layer 330 of elastomer and a second plate 340 more rigid than an elastomer.

Figure 4A:
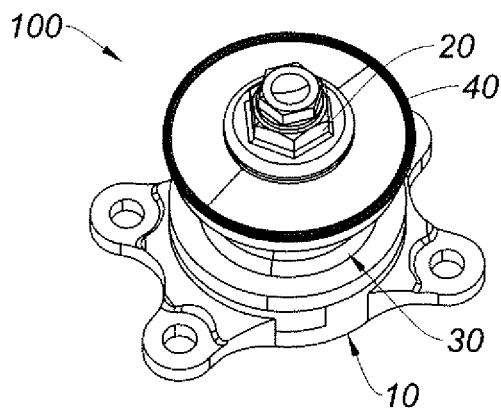
FIGS. 4(a) to 4(d) shows a first embodiment of a vibration isolation device according to the invention.
Figure 4C:
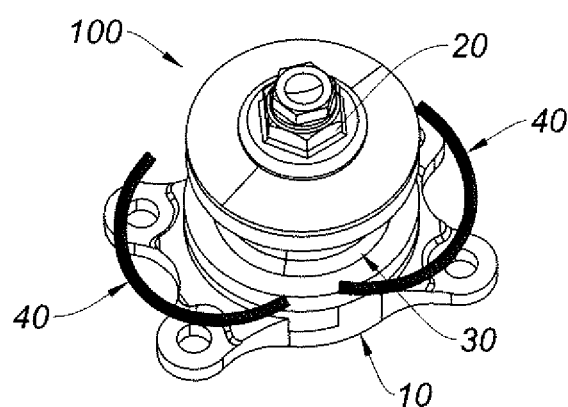
Figure 4B:
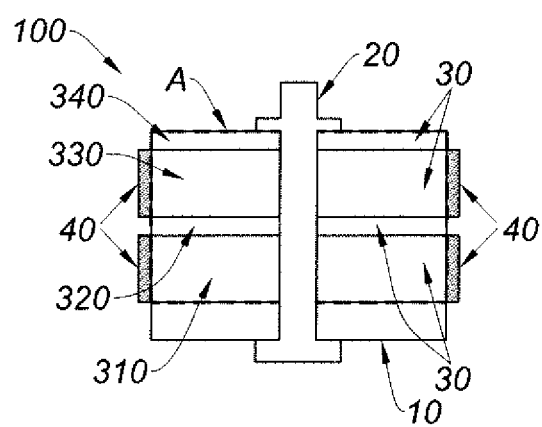
Figure 4D:
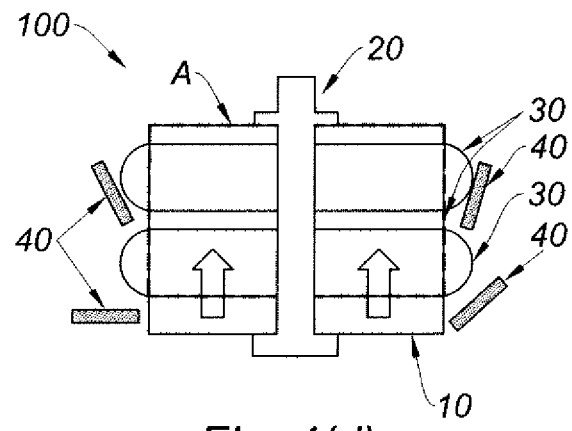

The resilient member 30 may be differently designed, for example by adding layers of elastomers and rigid plates, or by having only one layer of elastomer (compared to FIG. 4(b), the first plate 320 is removed and the layers 310, 330 form one same layer of elastomer).

FIG. 5 shows a vibration isolation device 100 according to the first embodiment which has been tested experimentally.

The device 100 shown in FIG. 5 has only one layer of elastomer, so that it does not comprise any plate 320, as shown in FIGS. 4(b) and 4(d). The layer of elastomer is therefore placed between and in contact with the frame 10 and the plate 340 and surrounds the axis 20, this latter being however not represented in FIG. 5.

In FIG. 5(a), we can see the vibration isolation device 100 before the experiment. It corresponds to a situation where the fuse mechanism 40 has not been activated yet. In FIG. 5(b), we can see the same vibration isolation device 100 after the fuse mechanism 40 has been activated.

The device 100 shown in FIG. 5 (INV) presents the following features:
- resilient member=elastomer (natural rubber)
- internal diameter of the resilient member (Di): Di=0.83 inch
- external diameter of the resilient member (De): De=2.5 inches
- thickness of the resilient member (e): e=0.2 inch
- strap (fuse mechanism): plastic with a breaking load of about 1,600 lbf (presence of a flaw within the strap)
- thickness of the strap: 0.3 inch.

Moreover, the device 100 has been tested with a bench applying a load/force displacing the frame 10 with respect to the plate 34 (in practice linked to the axis 20) at a speed of 0.2 inch/min.

Another vibration isolator device, identical to the device 100 shown in FIG. 5 but without strap (no fuse mechanism), has been tested in the same operating conditions.

It serves as a reference allowing to better identify the interest of the strap (fuse mechanism) used in the frame of the invention.

FIG. 6 shows the corresponding force (load) curves as a function of the displacement between the frame 10 and the plate 340, on the one hand for the invention (INV, presence of the strap) and for the reference (REF, no strap).

By comparing both curves (INV to REF), one can firstly note that the presence of the strap brings for the high stiffness required in normal operation of the vibration isolation device 100. Globally, for the curve INV, the first stiffness of the vibration isolation device (slope of the dashed lines DL1) is of about 44 Kip/inch just before the activation of the fuse mechanism 40. One can secondly note that once the breaking load of the strap 40 has been reached, the vibration isolation device 100 becomes softer, namely presents a second stiffness lower than the first stiffness. In the present case, we can note that the second stiffness (slope of the dashed lines DL2) is of about 22 Kip/inch. In other words, the activation of the fuse mechanism 40 allows reducing, by a factor of 2, the level of stiffness of the vibration isolation device 100 according to the invention.

For the curve REF, the behavior is the behavior of a soft vibration isolation device, namely with a low stiffness, in the whole range of measurements.

One can also note that above the deflection value of 0.055 inch, the behavior of both curves is the same (same slope). It is consistent with the fact that both devices (INV and REF), identical except for the presence of the strap, have to behave in the same way once, for the vibration isolation device 100 according to the invention, the strap 40 has broken and therefore no longer constrains the resilient member 30.

FIG. 7 shows another vibration isolation device 100 according to the first embodiment which has been tested experimentally.

The device 100 shown in FIG. 7 is similar to the specific design shown in FIG. 4(b), in that there are two layers 310, 330 separated by a rigid plate 320. Nevertheless, there is no axis 20, this latter being integrated within the frame 10, for example intended to be connected to an aircraft engine. The function of the axis in FIG. 4 is here fulfilled by the yoke Y. The resilient member is therefore placed between the frame 10 and the yoke, this latter being intended to be connected to the component to isolate.

Figure 7A:
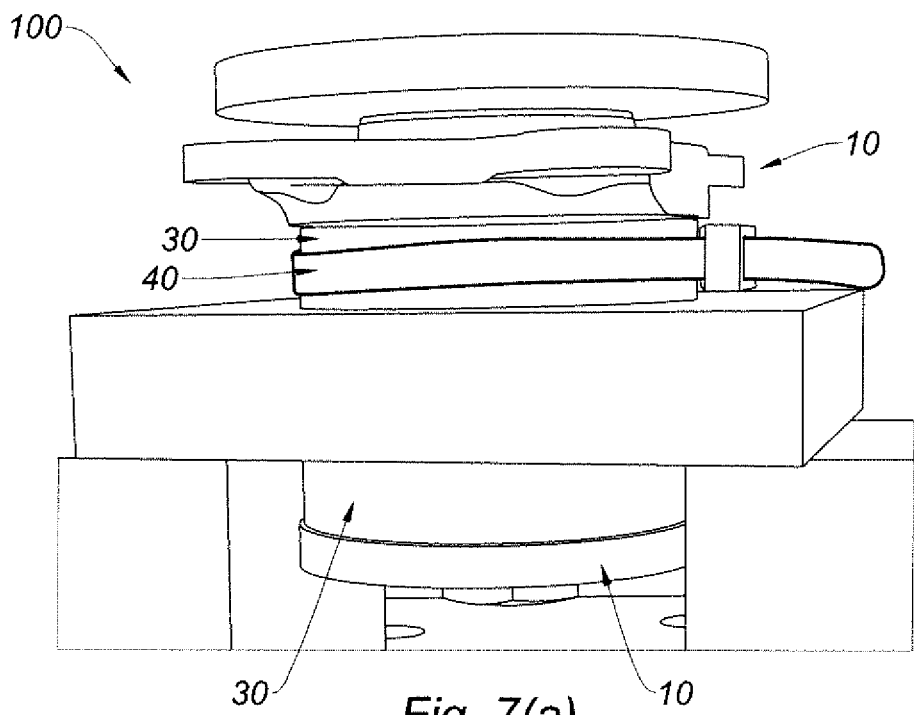
FIGS. 7(a) to 7(c), shows another vibration isolation device according to the first embodiment, which has been tested experimentally.
Figure 7B:
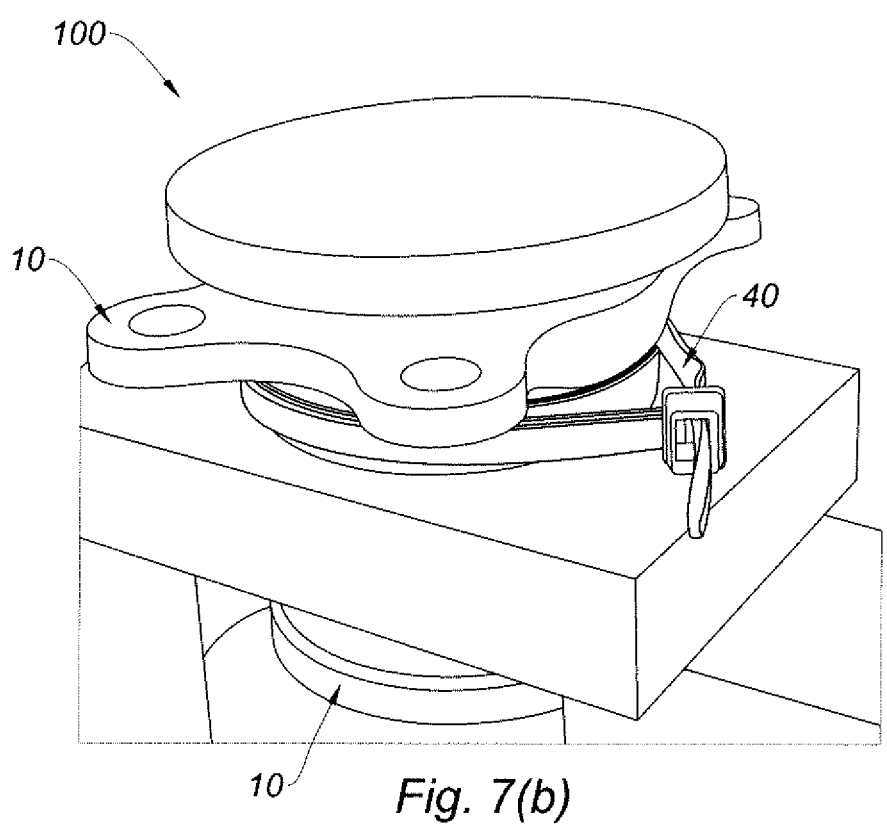

In FIG. 7(a), we can see the vibration isolation device 100 before the experiment. It corresponds to a situation where the fuse mechanism 40 has not been activated yet. In FIG. 7(b), we can see the same vibration isolation device 100 after the fuse mechanism 40 has been activated. Finally, in FIG. 7(c), one can see a schematic representation of the mount shown in FIG. 7(a).

The device 100 shown in FIG. 7 has been tested with two designs.

First Design (INV 1)
resilient member=two layers of elastomer (natural rubber) separated by a plate;
thickness of each layer of elastomer 320, 330 ($e_R$): $e_R$=1 inch
thickness of the metallic mid-plate (representing the yoke) separating both layers of elastomer ($e_P$): $e_P$=0.86 inch
thickness of a layer of elastomer exposed to fuse mechanism ($e_{RE}$): $e_{RE}$ 0.57 inch (for each layer)
thickness of a layer of elastomer not exposed to fuse mechanism ($e_{RNE}=e_R-e_{RE}$): $e_{RNE}$=0.43 inch (for each layer)
internal diameter of the elastomer (Di): Di=1.16 inch
external diameter of the elastomer (De): De=2.9 inches
diameter of the elastomer between both parts of the mid-plate ($D_{eP}$): $D_{eP}$=2.25 inches strap (fuse mechanism): plastic with a breaking load of about 2,130 lbf
thickness of the strap: 0.3 inch.

Second Design (INV 2)
The same as for the first design except that the strap (fuse mechanism) comprises a seeded flaw allowing to divide by two the thickness of the strap. In other words, at the level of the flaw, the strap thickness is of 0.15 inch. Accordingly, the breaking load of the strap is of about 1,060 lbf (also divided by two with regard to the first design).

It should be noted that for the first design, the breaking load of the strap is handled thanks to its locking mechanism while for the second design, it is handled by the flaw.

Moreover, whatever the test considered, the device 100 has been tested with a bench applying a load/force displacing the frame 10 with respect to the axis 20 at a speed of 0.2 inch/min.

Another vibration isolator device, identical to the device 100 shown in FIG. 7 but without strap (no fuse mechanism), has been tested in the same operating conditions.

It serves as a reference allowing to better identify the interest of the strap (fuse mechanism) used in the frame of the invention.

Figure 8:
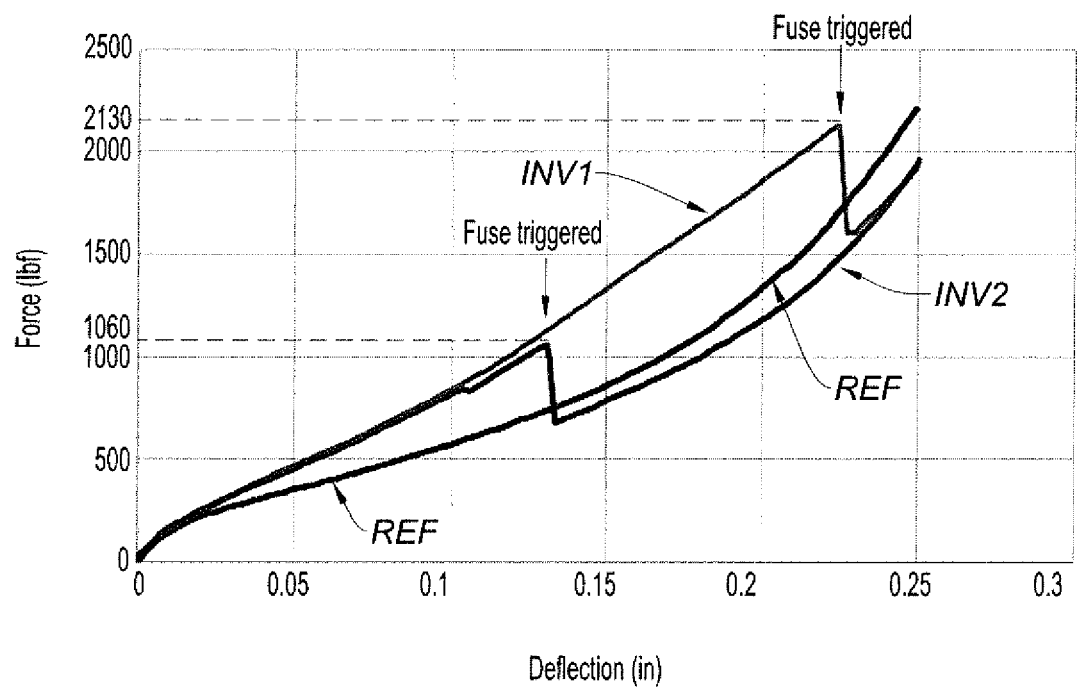
FIG. 8 is a graph showing the evolution of the force/load applied to the device as a function of the displacement for the vibration isolation device of FIG. 7, with two different designs, and for a reference vibration isolation device of the prior art.

The test results are shown in FIG. 8.

The reference (REF) behaves as a vibration isolation device with a low stiffness in the whole range of measurements.

The vibration isolation devices according to the invention (INV1, INV 2) both present a first stiffness, high, below the breaking load and, from the breaking load, a second stiffness lower than the first stiffness. For the first design (INV 1), the first stiffness just before the fuse mechanism is triggered is of about 10.6 Kip/inch and the second stiffness after the fuse mechanism has been triggered is of about 6.4 Kip/inch, namely a reduction of about 40% of the stiffness. For the second design (INV2), the first stiffness just before the fuse mechanism is triggered is also of about 10.6 Kip/inch and the second stiffness after the fuse mechanism has been triggered is also of about 6.4 Kip/inch.

As for the test results of FIG. 6, it is noted that the presence of the strap, whatever the test conditions, allows obtaining a first stiffness which is higher than the one obtained with the reference.

Moreover, by comparing the curves INV1 and INV 2, we note that the sole difference in behavior is linked to the threshold load. In the range of deflections below the point of activation of the fuse mechanism for the curve INV1 as well as in the range of deflections above the point of activation of the fuse mechanism for the curve INV2, the behavior of both designs of the vibration isolation device 100 is the same.

FIG. 9 shows a second embodiment of a vibration isolator device 101 according to the invention. More precisely, FIGS. 9(a) and 9(b) show the device 101 respectively in a first state wherein the fuse mechanism 41 has not been activated and in a second state wherein the fuse mechanism 41 has been activated.

In this embodiment, the fuse mechanism 41 is a collapsible spacer mounted between the frame 11 and the resilient member 31, generally through a rigid plate P separating the resilient member 31 from the fuse mechanism. The collapsible spacer 41 presents a breaking load corresponding to said predetermined threshold load.

In normal operation, namely below the threshold load, the vibration isolation device 101 presents a high stiffness. The resilient member 31 is constrained by the collapsible spacer 41 within the predetermined space A (represented in dashed lines in FIG. 9(a)).

When the loads applied to the vibration isolation device 101 are at least equal to the predetermined threshold value, the collapsible spacer collapses so that the resilient member 31 is released. The resilient member 31 can therefore further deform beyond the predetermined space A, as can be seen in FIG. 9(b), where said space A is also represented in dashed lines. As the resilient member 31 may further deform, the vibration isolation device 101 becomes softer and then presents a lower stiffness than in normal operation.

To reuse the mount, it is possible to change the collapsible spacer by providing a new collapsible spacer 41, eventually together with a new plate P and a new frame 11.

In FIGS. 9(a) to 9(d), the collapsible spacer 41 is formed by a plurality of parallel pillars P1, P2, P3, P4, P5, which are for example all oriented in the direction of the axis 2 (direction of the applied load on the device 101). Each pillar P1 to P5 comprises a necking N1, N2, N3, N4, N5 allowing to tune the breaking load of each pillar and therefore of the collapsible spacer 41.

Of course, and more generally, we may envisage a number N of pillars such that N≥2 where N is an integer.

As can be seen in FIGS. 9(a) and 9(b), the collapsible spacer may be used within a vibration isolation device 101 where the frame 11 is limited to a plate. However, as shown in FIGS. 9(c) and 9(d), the frame 11 may be a housing. More specifically, in FIG. 9(c), the vibration isolation device 101 corresponds to the typical structure of an engine mount while in FIG. 9(d), the vibration isolation device 101 corresponds to the typical structure of an APU mount.

In addition, the use of parallel pillars as a collapsible spacer 41 is not the sole possibility.

FIGS. 10(a) to 10(j) show different designs that may be used as a collapsible spacer.

Figure 10A:
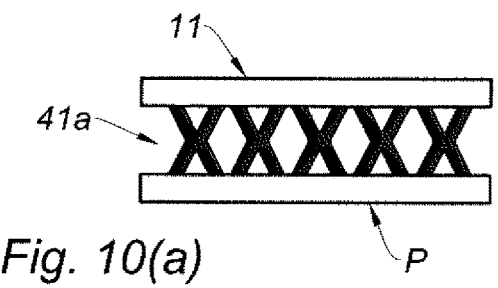
FIGS. 10(a) to 10(j), shows different designs that may employed for the second embodiment.

In FIG. 10(a), the collapsible spacer 41a is formed by a plurality of X-shaped breakable structures.

Figure 10F:
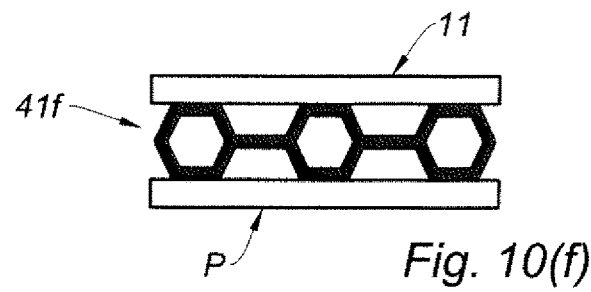
Figure 10B:
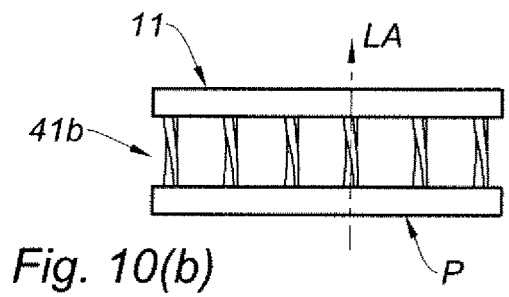

In FIG. 10(b), the collapsible spacer 41b is, as in FIG. 9, formed by a plurality of parallel pillars, which are for example all oriented in the direction of the axis 2 (direction of the applied load on the device 101). However, in that case, each pillar is twisted around its own longitudinal axis LA to tune the breakable force. The twisted shape then fulfills the same function as the necking in FIG. 9.

Figure 10G:
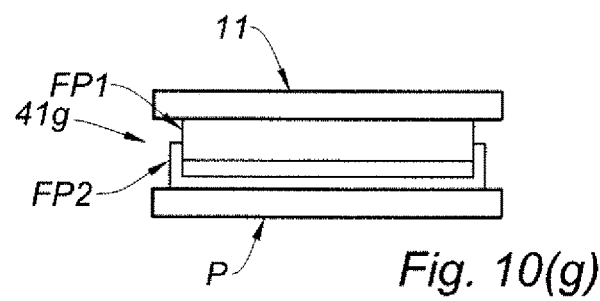
Figure 10C:
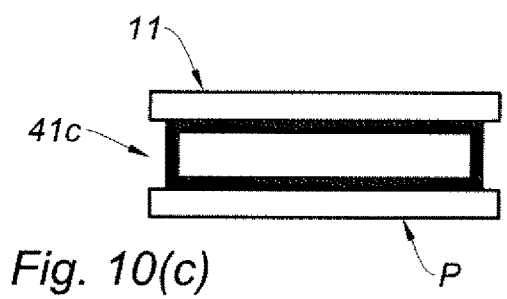

In FIG. 10(c), the collapsible spacer 41c is a hollow structure whose main walls are deformable.

Figure 10H:
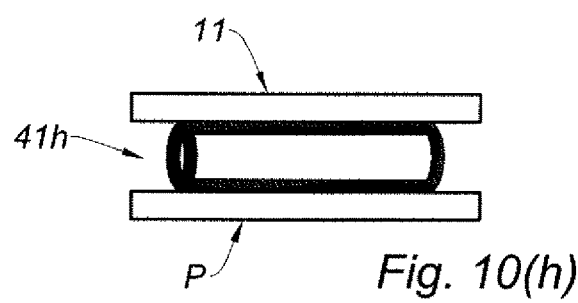
Figure 10D:
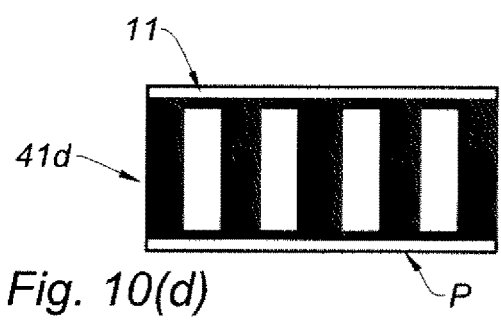

In FIG. 10(d), the collapsible spacer 41d is a hollowed spacer. The collapsible spacer 41d is a continuous structure comprising voids.

Figure 10I:
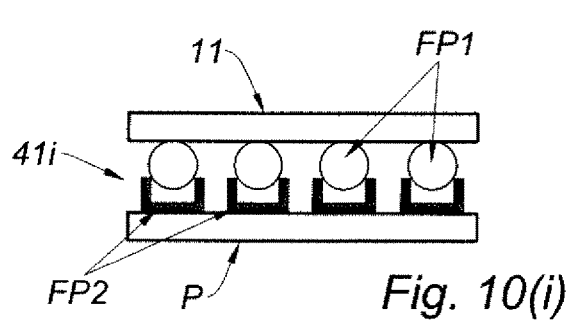
Figure 10E:
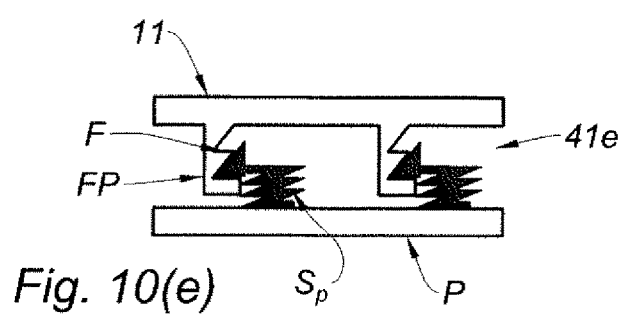

In FIG. 10(e), the collapsible spacer 41e is formed by a plurality of structures (preferably identical) arranged in parallel, for example in the direction of the axis 21. Each structure comprises a first part comprising a flaw F, such as a necking, and a second part SP consisting of a spring mounted in series with the first part FP. The first part FP is for example connected to the frame 11 and the spring SP is connected to the rigid plate P. In this embodiment, it is possible to adjust a preload on the resilient member, depending on how much the spring is squeezed. Besides, this embodiment makes it possible to activate the fuse mechanism (flaw F) without breaking. The mount can therefore be reused without changing any component within the mount.

In FIG. 10(f), the collapsible spacer 41f is formed by a honeycomb structure.

In FIG. 10(g), the collapsible spacer 41g comprises a first part FP1, massy, for example of rectangular shape, and a second part FP2, hollow, to partially receive the first part FP1. The first part FP1 is maintained in place with respect to the second part by a friction force. Where the loads applied to the vibration isolation device 101 is at least equal to the friction force, the first part FP1 can displace in the axis direction within the second part FP2 until the second part FP2 fully receives the first part FP1. The distance between the frame 11 and the plate P reduces so that more space is given to the resilient member 31 to deform.

In FIG. 10(h), the collapsible spacer 41h is a hollow structure, squeezable. In that case, the predetermined threshold value corresponds to the buckling load of the hollow structure.

In FIG. 10(i), the collapsible spacer 41i operates in the same way as in FIG. 10(g). Nevertheless, it differs in its structure. Indeed, it comprises a plurality of first parts FP1, each being massy, and each being combined with a corresponding second part FP2. Each second part FP2 is of the same kind of the second part FP2 of FIG. 10(g). However, in the representation given in FIG. 10(i), each first part FP1 is a pin. The first parts are advantageously parallel, as well as the second parts.

Figure 10J:
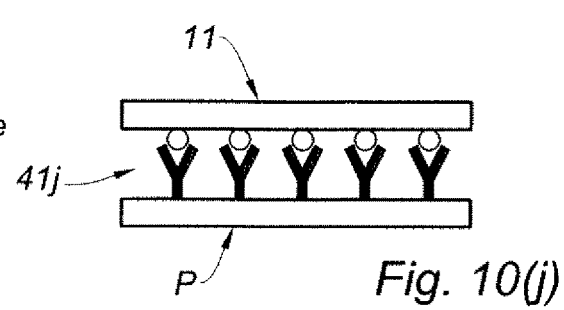

In FIG. 10(j), the collapsible spacer 41j is formed by a plurality of parallel structures, for example all oriented in the direction of axis 21. Each structure comprises a ball cooperating with a Y structure which is breakable. In normal operation of the vibration isolator device, the ball is maintained between the branches of the Y structures. Once the loads applied to the vibration isolation device reaches the predetermined threshold value, the loads applied to ty the ball moves apart the branches of the Y, and finally breaks the Y structure.

FIG. 11 shows a third embodiment of a vibration isolation device 102 according to the invention. More precisely, FIGS. 11(a) and 11(b) show the vibration isolation device 102 respectively in a first state wherein the fuse mechanism 42 has not been activated and in a second state wherein the fuse mechanism 42 has been activated. The axis is referenced 22.

In this embodiment, the fuse mechanism 42 is formed by:
a cushion 420 mounted between the frame 12 and the resilient member 32, and
a relief valve RV connected to said cushion 420,
said relief valve RV being configured to open where the loads applied to the vibration isolation device 102 are at least equal to said predetermined threshold load.

A plate P, more rigid than the resilient member 32 and the cushion 420, is generally placed between the resilient member 32 and the cushion 420. This plate P may be made of metal.

The cushion 420 may an aeraulic or hydraulic cushion.

Optionally, the relief valve RV may be connected to an accumulator ACC in order to recover the fluid initially contained in the cushion, once the relief valve RV has been triggered.

In normal operation, namely below the threshold load, the vibration isolation device 102 presents a high stiffness. The resilient member 32 is constrained by the cushion 42, inflated, within the predetermined space A (represented in dashed lines in FIG. 11(a)).

When the loads applied to the vibration isolation device 102 are at least equal to the predetermined threshold value, the relief valves RV triggers and as a consequence the cushion 420 deflates so that the resilient member 32 is finally released. The resilient member 32 can therefore further deform beyond the predetermined space A, as can be seen in FIG. 11(b), where said space A is also represented in dashed lines. As the resilient member 32 may further deform, the vibration isolation device 102 becomes softer and then presents a lower stiffness than in normal operation.

Figure 11A:
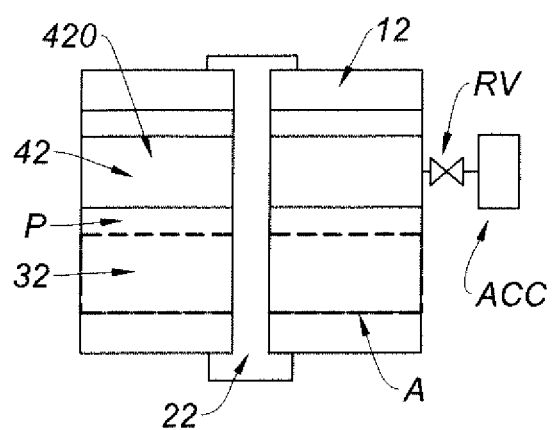
FIGS. 11(a) to 11(d), shows a third embodiment of a vibration isolation device according to the invention.
Figure 11B:
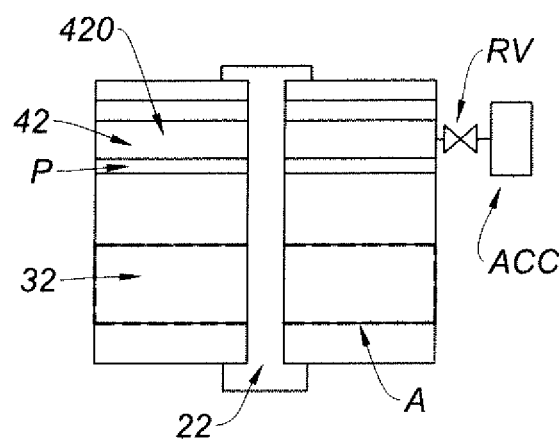
Figure 11C:
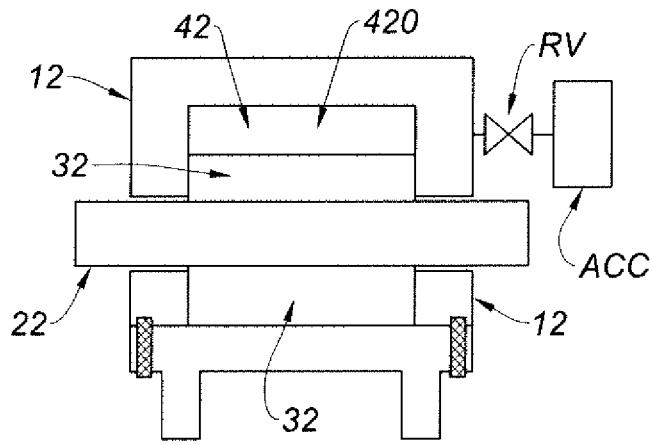
Figure 11D:
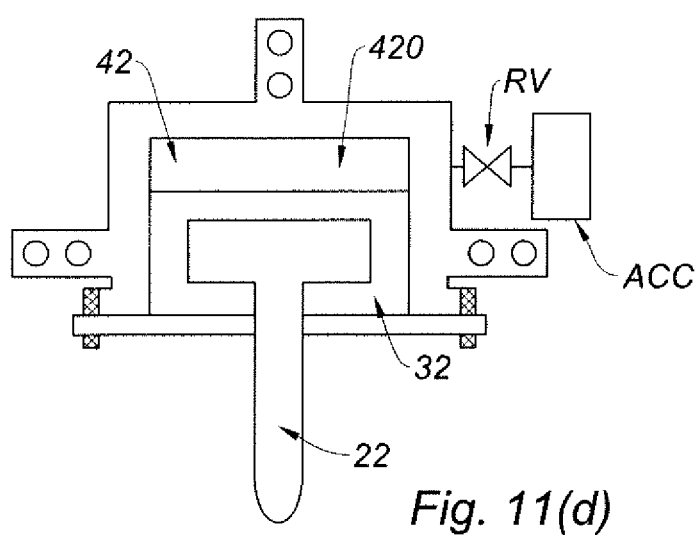

As can be seen in FIGS. 11(a) and 11(b), the cushion 42 may be used within a vibration isolation device 102 where the frame 12 is limited to a plate. However, as shown in FIGS. 9(c) and 9(d), the frame 12 may be a housing. More specifically, in FIG. 11(c), the vibration isolation device 102 corresponds to the typical structure of an engine mount while in FIG. 11(d), the vibration isolation device 102 corresponds to the typical structure of an APU mount.

In the third embodiment, the pressure at which the relief valve RV opens therefore corresponds to the predetermined threshold value.

In the embodiment of FIG. 11, the reuse of the fuse mechanism is quite simple, as if the cushion 420 is not altered, it is sufficient to re-inflate said cushion 420.

FIG. 12 shows a fourth embodiment of a vibration isolation device 103 according to the invention. More precisely, FIGS. 12(a) and 12(b) show the vibration isolation device 103 respectively in a first state wherein the fuse mechanism 43 has not been activated and in a second state wherein the fuse mechanism 43 has been activated.

In the present embodiment, the resilient member 33 is comprised of a stack containing a first layer 331 of elastomer, a first plate 332 more rigid than an elastomer, a second layer 333 of elastomer and a second plate 334 also more rigid than an elastomer.

Figure 12A:
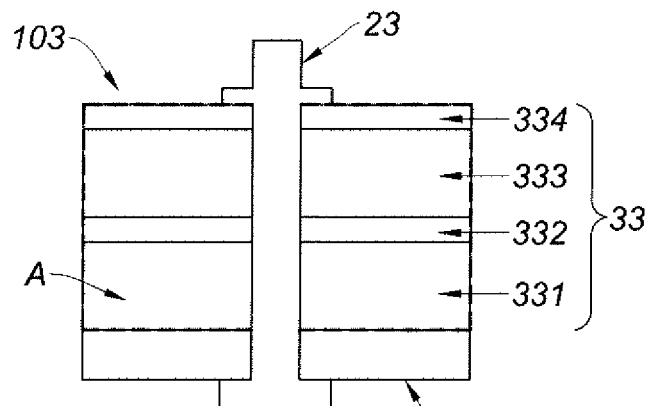
FIGS. 12(a) to 12(d), shows a fourth embodiment of a vibration isolation device according to the invention.
Figure 12B:
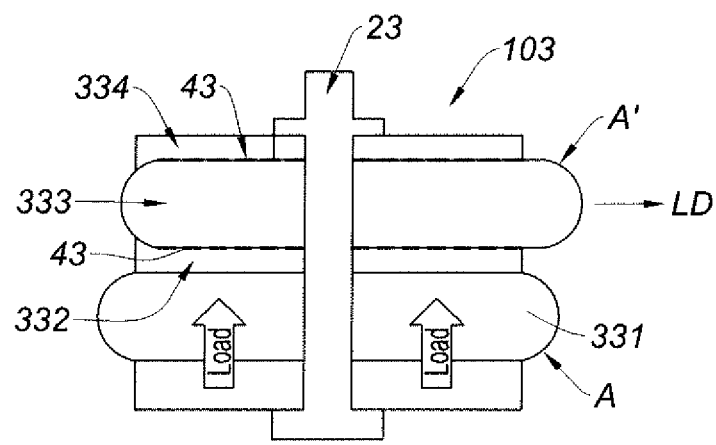

Each layer 331, 333 of elastomer is partially bonded to the frame 13 and/or to a rigid plate 332, 334, as schematically represented by dashed lines in FIG. 12(b). The axis is referenced 23.

This partial bonding allows obtaining a bonding force between the elastomer and the frame or plate to which said elastomer faces defining said fuse mechanism 43.

Figure 12C:
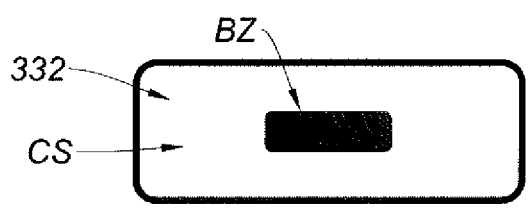

FIG. 12(c) shows, for example at the level of the interface between the rigid plate 331 and the second layer 333 of elastomer, the bonding zone BZ between said rigid plate 332 and said second layer 333 of elastomer. The contact surface CS between the rigid plate 332 and the second layer 333 of elastomer corresponds to the surface of the rigid plate 332. However, the bonding surface BS between the rigid plate 332 and the second layer 333 of elastomer is limited to a central zone of the rigid plate 332. In other words, except the bonding zone, the elastomer is not bonded to the rigid plate. As a consequence, the bonding force linking the rigid plate 332 to the second layer 333 of elastomer is limited with regard to a classical design wherein the bonding zone corresponds to the whole surface of the rigid plate 332.

It should be understood that the bonding zone is not limited to a central zone of the rigid plate 332.

Figure 12D:

Another example is provided in FIG. 12(d). In that variant, the bonding zone is made in the periphery of the rigid plate 332.

Of course, if FIGS. 12(c) and 12(d) have been described in reference to the contact surface between the rigid plate 332 and the second layer 333 of elastomer, one should understand that this description also applies to any zone of contact between an elastomer of the resilient member 32 and another plate or the frame 13 of the vibration isolation device 103.

To understand how the vibration isolation device 103 works, we have represented in FIG. 12(b) a case where the first layer 331 of elastomer is bonded to the whole surface of the adjacent plates and the second layer 333 of elastomer is partially bonded to the adjacent plates. The first layer 331 of elastomer is constrained by its environment within the predetermined space A (in FIG. 12(a), before any deformation and in FIG. 12(b) during deformation). The second layer 333 of elastomer, partially bonded, is released, namely is no longer bonded to its adjacent plates, once the loads applied to the vibration isolation device 103 are at least equal to the predetermined threshold value, so that the second layer of elastomer may deform beyond said predetermined space A, towards another space A'. It should be noted that, in the case of normal bonding for the second layer 333 of elastomer, the predetermined space would also be the space A and that is why the comparison with the first layer 331 of elastomer makes sense. More precisely, in the absence of bonding, the second layer 333 of elastomer may further deform beyond said predetermined space A, especially in the lateral direction LD as shown in FIG. 12(b).

As a consequence, the resilient member 33 presents, in normal operation, a first and high stiffness and once the bonding zone BZ no longer exists (fuse mechanism activated) with a second stiffness, lower than the first stiffness.

In the embodiment of FIG. 12, the reuse of the mount may be made by removing the existing layers of elastomers and by providing new layers of elastomers, bonded in the same way.

Figure 13A:
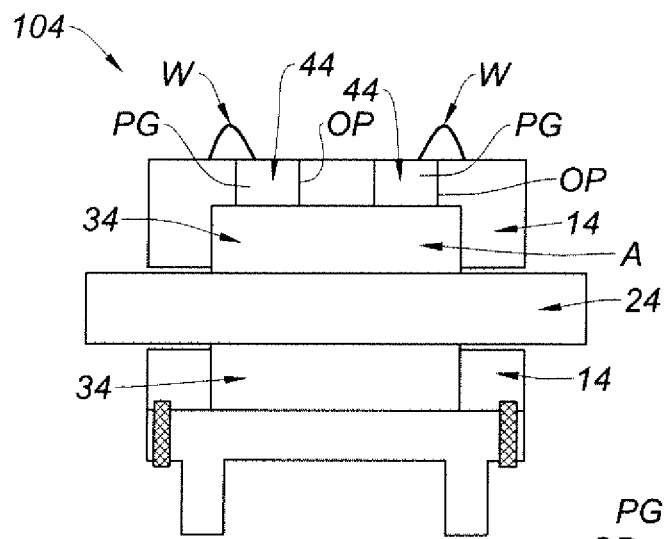
FIGS. 13(a) and 13(b), shows a fifth embodiment of a vibration isolation device according to the invention FIG. 14, which comprises
Figure 13B:
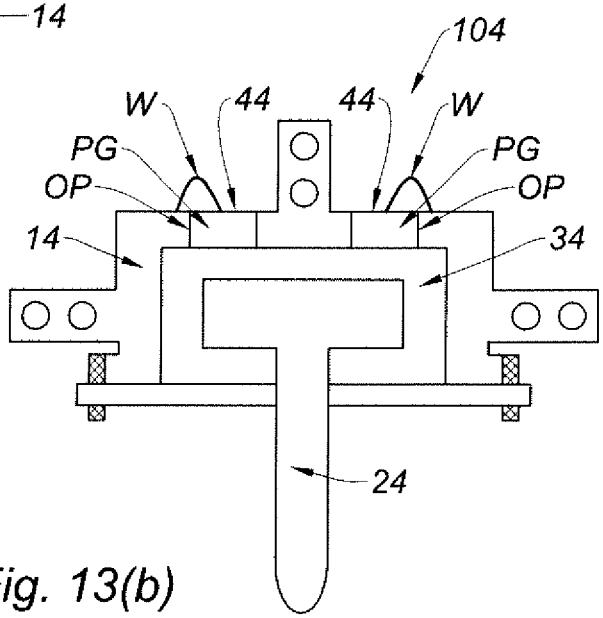

FIG. 13 shows a fifth embodiment of a vibration isolator device 104 according to the invention, respectively for an engine mount in FIG. 13(a) and for an APU mount in FIG. 13(b).

In this embodiment, the fuse mechanism 44 comprises at least one plug PG cooperating with an opening OP made in the frame 14 (housing here). The axis is reference 24

In normal operation, the plug PG is disposed within the opening OP. In that case, the plug PG operates as a part of the frame 14. The resilient member 34 is constrained within the space A, given by the housing so that the vibration isolator device 104 presents a first and high stiffness.

Figure 14A:
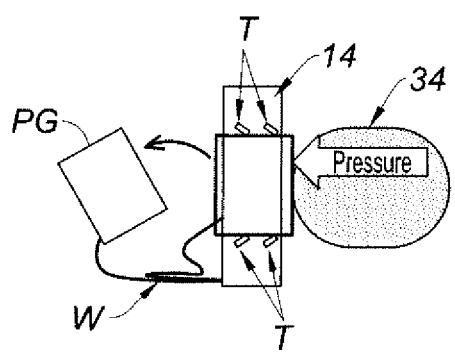
FIGS. 14(a) to 14(c), shows different specific designs that may be used together with the fifth embodiment.
Figure 14B:
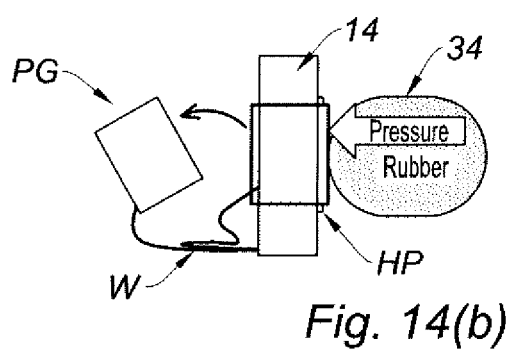
Figure 14C:
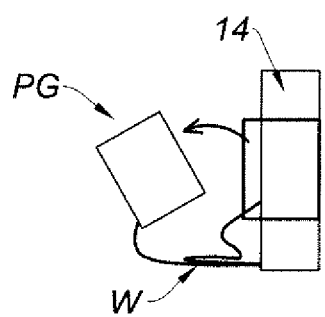

Once, the predetermined threshold value is reached, the plug PG pops out under the pressure exerted by the resilient member 34, this latter undergoing the loads applied to the vibration isolator device 104. FIGS. 14(a) to 14(c) show the vibration isolation device, once the plug PG has popped out. From this time, the resilient member can deform further, for example by passing within the opening or even getting out of the housing, therefore going beyond the predetermined space A which is limited by said housing 14. The vibration isolation device 104 presents a second stiffness, lower than the first stiffness.

In practice, there are several ways to define the load threshold value in this embodiment.

For example, in FIG. 14(a), there is provided, within the wall of the housing/frame 14, teeth T which get out of the wall and lead to the internal space of the opening OP. As a consequence, the teeth interact with the plug to block the plug PG within the opening. Where the threshold value is attained, the teeth break and free the plug PG.

Another example is given in FIG. 14(b). The plug PG is retained, in normal operation, within the opening OP thanks to a holding plate HP preventing said plus from popping out. Once the predetermined threshold value is reached, the pressure exerted by the resilient member 34 breaks the holding plate HP. As a consequence, the plug PG is no longer retains within the opening and pops out under the pressure of the resilient member 34.

Another example is given in FIG. 14(e). In that case, it is the friction force between the plus and the housing 14 which is used. In practice, the plug PG and the opening OP are designed to provide for a given level a friction force and the load threshold value corresponds to this friction force. This last embodiment is particularly advantageous as thanks to the wire W, the plug PG can be put into place again for a reuse. It is of course also possible for FIGS. 14(a) and 14(b), but it further necessitates the change of the teeth T or of the holding plate HP.

Figure 15A:
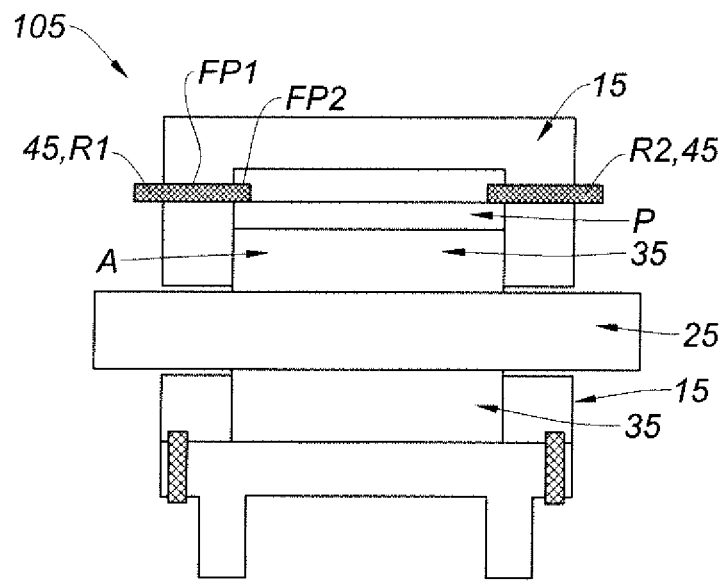
FIGS. 15(a) and 15(b), shows a sixth embodiment of a vibration isolation device according to the invention.
Figure 15B:
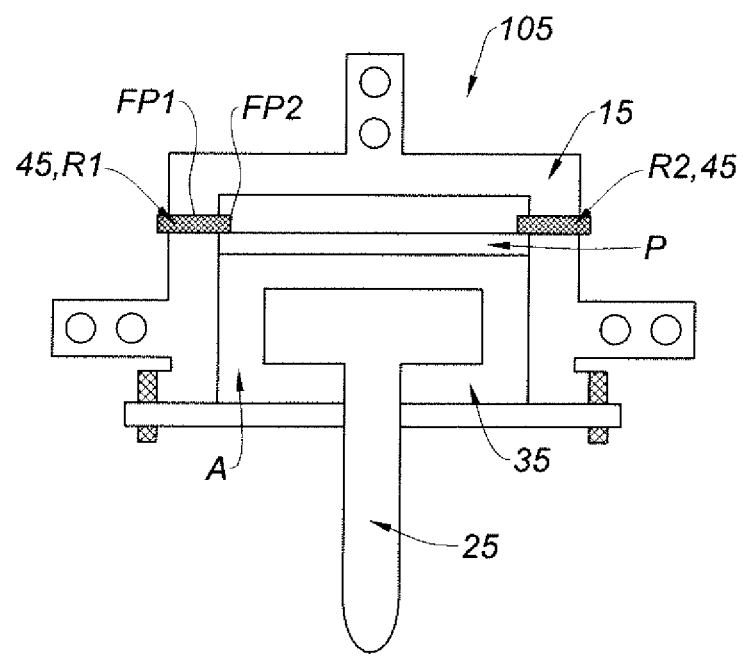

FIG. 15 shows a sixth embodiment of a vibration isolator device 105 according to the invention, respectively for an engine mount in FIG. 15(a) and for an APU mount in FIG. 15(b).

In this embodiment, the fuse mechanism 45 comprises at least one breakable retainer R1, R2, said retainer R1, R2 having a first part FP1 encased within the frame 15 and a second part FP2 projecting beyond said frame 15 to cooperate with a plate P covering the resilient member 35, said at least one retainer R1, R2 having a breakable load corresponding to the predetermined threshold load.

The retainer R1, R2 is placed in order to undergo a shear stress when loads are applied to the vibration isolation device 105 and where said shear stress is above a given value, the second part of the retainer R1, R2 separates from the first part of the retainer R1, R2 to release the resilient member 35.

There are several possibilities to design such a retainer R1, R2. Among these possibilities, some of them are shown in FIGS. 16(a) to 16(f).

Figure 16A:
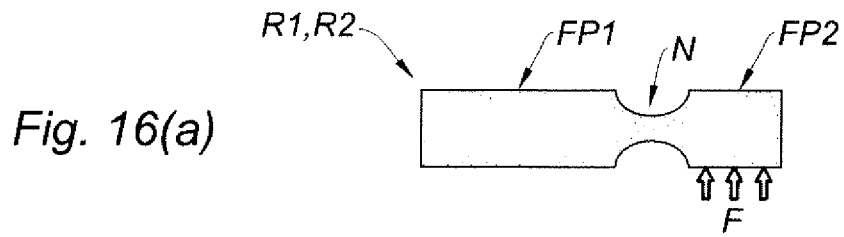
FIGS. 16(a) to 16(f), shows different specific designs that may used together with the sixth embodiment.

In FIG. 16(a), the retainer R1, R2 has a necking N separating the two parts FP1, FP2 of the retainer. The loads applied to the vibration isolation device 105 induce a force F exerted by the resilient member 35 through the plate P, this plate being in contact with the second part FP2 of the retainer. Once the threshold value is reached, the retainer breaks at the level of the necking N. The resilient member is thus released and can further deform beyond the predetermined space A, limited by the retainer.

Figure 16B:
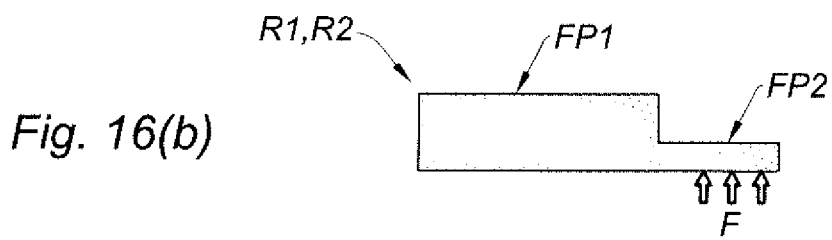

In FIG. 16(b), the retainer R1, R2 has a second part FP2 thinner than the first part FP1. The retainer can breaks where the stresses at the level of the contact zone between both parties exceeds a given value corresponding to the predetermined threshold value for the vibration isolation device 105.

Figure 16C:
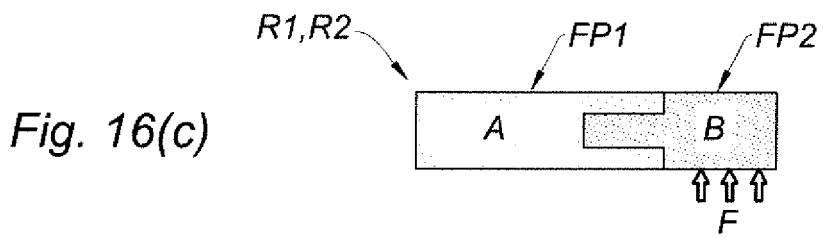

In FIG. 16(c), the second part FP2 of the retainer R1, R2 is independent from the first part of the retainer and is simply inserted into the first part. The retaining force of the second part FP2 in the first part FP1 allows defining the load threshold value for the vibration isolation device 105.

Figure 16D:
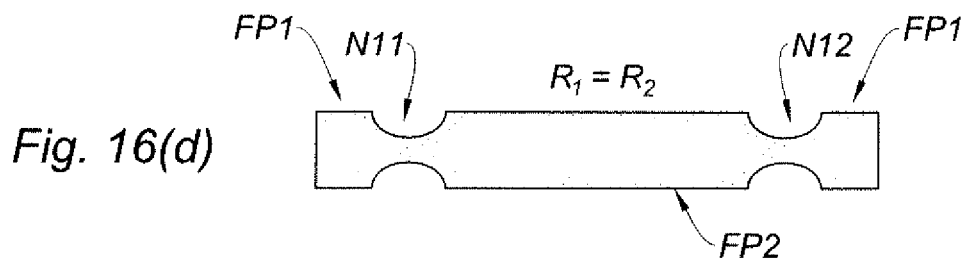

In FIG. 16(d), the retainers R1, R2 form one unique retainer. The first parts FP1 are encased within the wall of the frame/housing 15 and the second part is in contacts with the plate P. The principle is however the same as for the variant of FIG. 16(a).

Figure 16E:
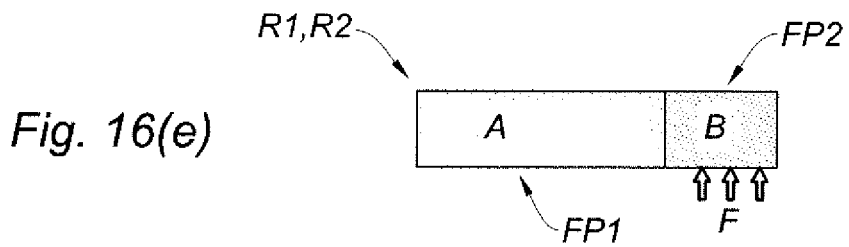
Figure 16F:
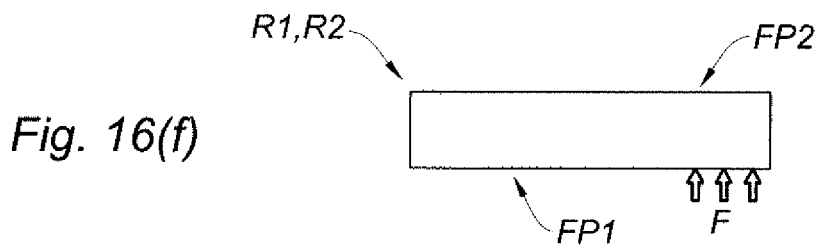

In FIG. 16(e), the retainer R1, R2 comprises a second part FP2 bonded, for example chemically, to the first part FP1. Once the force F reaches a value exceeding the bonding force, the second part FP2 is no longer attached to the first part FP1.

Finally, in FIG. 16(e), the fuse mechanism is a retainer of constant section whose predetermined threshold value is based on the bending limit of the retainer R1, R2.

For all the variants shown in FIG. 16, the retainer may have the form of a beam, rod or plate.

In the embodiment of FIG. 15 and FIG. 16, the reuse of the mount only implies the change of the retainers R1, R2.

It should also be noted that for ell the embodiments described here above, said predetermined threshold load may be tuned as desired. For most embodiments, the tuning is carried out during the design of the fuse mechanism and its fabrication. Nevertheless, in some embodiments, for example, with the embodiment of FIGS. 11(a) to 11(d) (cushion+relief valve), it is possible to provide for a relief valve for which the pressure at which the valve triggers is adjustable even after the mount is completely manufactured.

Finally, one should also mention that a vibration isolation device according to the invention may also have more than one fuse mechanism.

It is of interest if one desires to provide for a mount capable of having, in use, more than two different stiffnesses.

Figure 18A:
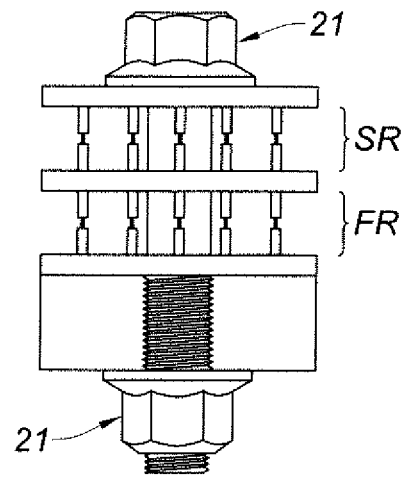
FIGS. 18(a) to 18(c), shows a variant comprising more than one fuse mechanism.
Figure 18B:
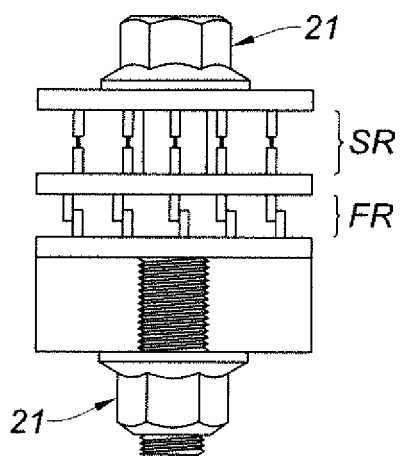
Figure 18C:
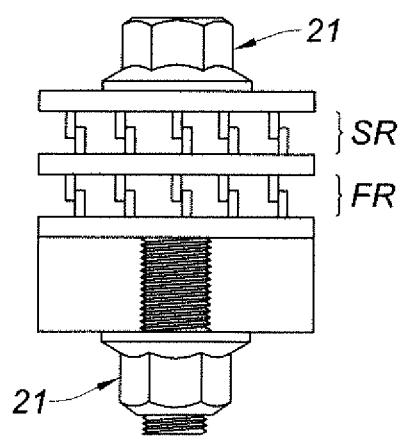

For example, FIG. 18, which comprises FIGS. 18(a) to 18(c) shows a case based on the general design of FIG. 9 (particular case of a collapsible spacer), where we can see a first row FR of a first plurality of parallel pillars, designed for example as described previously in regard of FIG. 9, and a second row SR of a second plurality of parallel pillars. The second row SR is located in series with the first row FR, with respect to the axis 21, namely with respect to the direction of the load. Nevertheless, the design of the pillars of the second row differs from the design of those of the first row to provide a second predetermined threshold value, different from said predetermined threshold value. In practice, it may be made by designing the necking of each pillar of the second row SR with a larger cross-section of the corresponding necking of each pillar of the first row FR. In that way, where said predetermined threshold load is reached, the pillars of the first row FR break and we have the configuration of FIG. 18(b). If the load applied to the vibration isolation device reaches said second predetermined threshold load, then the pillars of the second row SR also break, as shown in FIG. 18(c).

As a consequence, the vibration isolation device initially behaves normally (FIG. 18(a)) with a first stiffness. Then, for example in case of a fan blade-out, provides for a second stiffness lower than the first stiffness (FIG. 18(b)). Then, in case for example of an additional fan blade-out (for instance where an additional blade breaks), the vibration isolation device provides for a third stiffness, lower than the second stiffness (FIG. 18(c)).

Of course, this possibility is not limited to the procurement of three different stiffnesses but may be generalized to N different stiffnesses, the $(i+1)^{th}$ stiffness being lower than the $i^{th}$ stiffness ($1 \le i \le N-1$).

Many other designs may be envisaged to provide the same effect.

For example, we may also have only one row, as in FIG. 9, but with parallel pillars which are not all identical. For example, one can have a first set of pillars on the left side of the mount and a second set of pillars on the right side of the mount, said pillars of the second set of pillars having each a necking with a cross-section which is higher than the cross-section of the pillars of the first set of pillars.

Of course, the designs discussed here above are also applicable to the different variants of fuse mechanisms which are qualified as collapsible spacers (FIG. 10).

Moreover, the possibility of having more than two different stiffnesses is not limited to the case of the collapsible spacer.

This possibility is indeed compatible with all the fuse mechanisms described previously.

More particularly, in case of the use of plugs, each plug can be released at different pressures. It may be for example obtained with the design shown in FIG. 14(c), with plugs of different sizes. In that way, the friction force retaining each plug in its orifice is not the same.

For the fuse mechanism based on a strap (FIG. 4), more than one strap can be deployed, each trap having a different breaking load.

For the cushion mechanism (FIG. 11), a stack of different cushions, each being connected to a dedicated relief valve may be used. In that case, each relief valve is set to release the pressure within the cushion to a value which differs from the other relief valves.

For the controlled bonding (FIG. 12), it is also possible to have two different rows, a first row for which the elastomer-metal bonding force has a first value and a second row for which the elastomer-metal bonding force has a second value, higher than the first value.

Similar comments may be made for the other embodiments.

In the above description, the resilient member has been presented as being an elastomer, eventually in several layers separated by at least one rigid plate (namely a plate more rigid than the elastomer; for example a metallic plate).

Figure 7C:
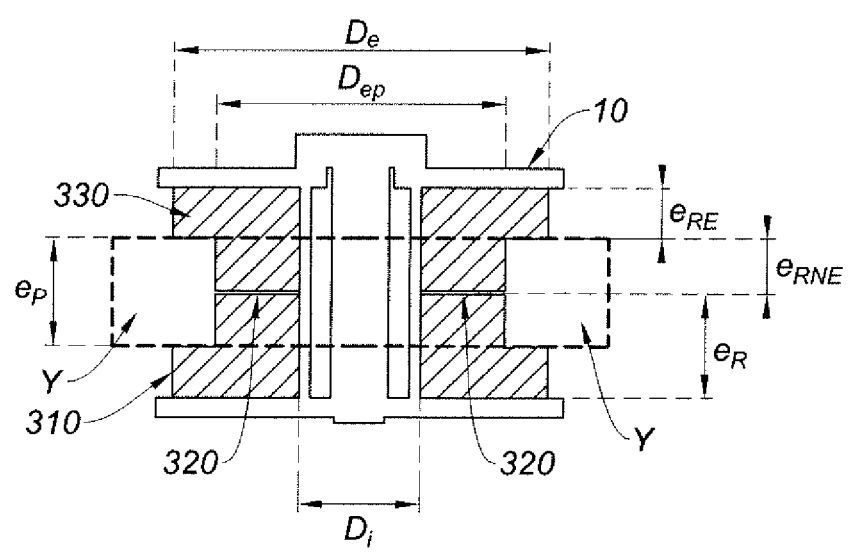

One should also mention that the configuration of FIG. 7(c), in which the resilient member is placed between the frame and the yoke is possible as a variant to the configurations of FIG. 9(a) (collapsible spacer), 11(a) (cushion+ relief valve) and 12(a) (controlled bonding). More generally, the configuration of FIG. 7(c) is possible as soon as the resilient member is exposed, rendering it possible to mount the resilient member to a yoke.

It should be noted that, in place of a natural rubber as elastomer, a silicone rubber may be used. More generally, in place of an elastomer, a thermoplastic elastomer (TPE) may also be used.

Figure 17:
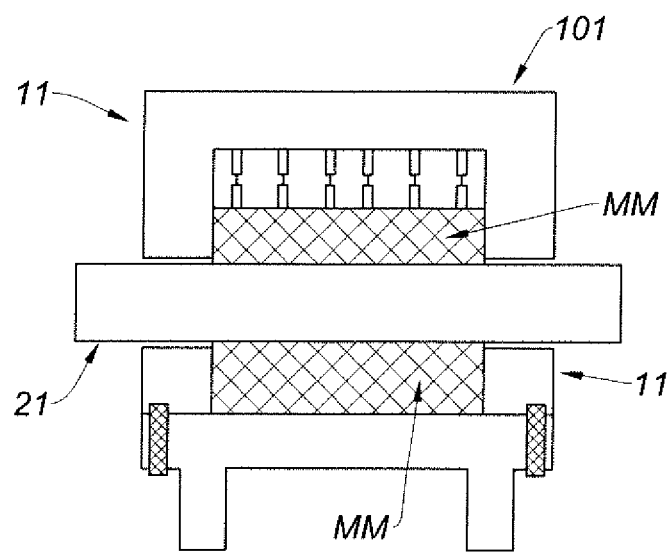
FIG. 17 shows a variant wherein the resilient member is a metal mesh, more precisely in the frame of the embodiment of FIG. 9.

In addition, and as another variant, the resilient member may be a metal mesh. FIG. 17 shows for example the scheme of FIG. 9(c) wherein the elastomer 31 (resilient material of the resilient member) is replaced by a metal mesh MM. Of course, a metal mesh may be used in any of the embodiments discussed previously, instead of an elastomer or instead of a stack comprising at least two layers of elastomer and a rigid plate separating the layers of elastomer.

The invention claimed is:

1. A vibration isolation device comprising:
    a frame intended to be mounted on an engine casing,
    a structure intended to be mounted to an external component to isolate,
    a resilient member located between said frame and said structure,
    at least one fuse mechanism ensuring that said vibration isolation device presents a first stiffness when loads applied to said vibration isolation device are below a predetermined threshold load, and a second stiffness, lower than the first stiffness, when loads applied to the vibration isolation device are at least equal to said predetermined threshold load,
wherein said fuse mechanism is arranged, within said vibration isolation device, to constrain said resilient member within a predetermined space when the loads applied to the vibration isolation device are below said predetermined threshold load and to release said resilient member so that this latter is capable of deforming beyond said predetermined space when loads applied to the vibration isolation device are at least equal to said predetermined threshold load.

2. A vibration isolation device according to claim 1, wherein said fuse mechanism is a strap surrounding said resilient member and presenting a breaking load corresponding to said predetermined threshold load.

3. A vibration isolation device according to claim 1, wherein said fuse mechanism is a collapsible spacer mounted between said frame and said resilient member and presenting a breaking load corresponding to said predetermined threshold load.

4. A vibration isolation device according to claim 3, wherein said collapsible spacer is chosen amongst:
    a plurality of parallel pillar, each pillar comprising either a necking or being twisted around its own longitudinal axis;
    a plurality of X-shaped breakable structures;
    a hollow structure whose main walls are deformable;
    a hollowed spacer made of a continuous structure comprising voids;
    a plurality of structures arranged in parallel, each structure comprising a first part having a flaw and a second part consisting of a spring mounted in series with the first part;
    a honeycomb structure;
    at least a first part, massy, and at least a corresponding second part, hollow, to partially receive said first part, said at least first and second parts being maintained together by a friction force;
    a hollow structure, squeezable;
    a plurality of parallel structures, each structure comprising a ball cooperating with a Y structure which is breakable.

5. A vibration isolation device according to claim 1, wherein said fuse mechanism comprises:
    an inflatable cushion mounted between said frame and said resilient member, and
    a relief valve connected to said cushion,
said relief valve being configured to open where the loads applied to the vibration isolation device are at least equal to said predetermined threshold load.

6. A vibration isolation device according to claim 1, wherein said resilient member is partially bonded;
    to said frame, and/or
    where said resilient member is comprised of a stack at least containing a first layer of a resilient material, a second layer of resilient material and a plate both arranged between and more rigid than said first layer of resilient material and said second layer of resilient material:
    to said plate
    so as to define a bonding force between said resilient member and said frame and/or said plate, said bonding force defining said fuse mechanism and corresponding to said predetermined threshold load.

7. A vibration isolation device according to claim 1, wherein said fuse mechanism comprises at least one plug cooperating with an opening made in said frame.

8. A vibration isolation device according to claim 1, wherein said fuse mechanism is comprised of at least one breakable retainer, said retainer having a first part encased within said frame and a second part projecting beyond said frame to cooperate with a plate covering the resilient member, said at least one retainer having a breakable load corresponding to said predetermined threshold load.

9. A vibration isolation device according to claim 8, wherein said at least one retainer is chosen amongst:
    a retainer having a necking separating the two parts of the retainer;
    a retainer having a second part thinner than its first part;
    a retainer whose second part is inserted in its first part;
    a retainer whose second part is bonded to its first part; or
    a retainer of constant section, for which said predetermined threshold value corresponds to the bending limit of the retainer.

10. A vibration isolation device according to claim 1, wherein said resilient member comprises at least one layer of an elastomer or of a thermoplastic elastomer or of a metal mesh.

11. A vibration isolation device according to claim 1, wherein said elastomer is a silicone rubber or a natural rubber.

12. A vibration isolation device according to claim 1, comprising at least one second fuse mechanism ensuring that said vibration isolation device presents a third stiffness, lower than the second stiffness, when loads applied to the vibration isolation device are at least equal to a second predetermined threshold load, higher than said predetermined threshold load.

* * * * *